(12) United States Patent
Hopper

(10) Patent No.: US 8,868,668 B2
(45) Date of Patent: Oct. 21, 2014

(54) SELF-MANAGEMENT OF GROUP EMAIL RECEPTION

(75) Inventor: Robin Hopper, Prague (CZ)

(73) Assignee: CA, Inc., Islandia, NY (US)

( * ) Notice: Subject to any disclaimer, the term of this patent is extended or adjusted under 35 U.S.C. 154(b) by 333 days.

(21) Appl. No.: 13/411,010

(22) Filed: Mar. 2, 2012

(65) Prior Publication Data

US 2013/0232206 A1    Sep. 5, 2013

(51) Int. Cl.
*G06F 15/16* (2006.01)

(52) U.S. Cl.
USPC .......................................................... 709/206

(58) Field of Classification Search
CPC ..... H04L 51/22; H04L 12/2495; H04L 12/58; H04L 12/585; H04L 12/5855
USPC .................................. 709/204–207
See application file for complete search history.

(56) References Cited

U.S. PATENT DOCUMENTS

| | | | |
|---|---|---|---|
| 2003/0046533 A1* | 3/2003 | Olkin et al. .................... | 713/152 |
| 2003/0088824 A1* | 5/2003 | Ayan ............................. | 715/500 |
| 2005/0080854 A1* | 4/2005 | Tervo ............................ | 709/206 |
| 2005/0080863 A1 | 4/2005 | Daniell | |
| 2005/0228899 A1* | 10/2005 | Wendkos et al. ............. | 709/232 |
| 2006/0059539 A1 | 3/2006 | Shashikumar et al. | |
| 2006/0200523 A1* | 9/2006 | Tokuda et al. ................ | 709/206 |
| 2006/0271631 A1* | 11/2006 | Qureshi et al. ................ | 709/206 |
| 2007/0022162 A1* | 1/2007 | Thayer et al. ................ | 709/206 |
| 2008/0034046 A1* | 2/2008 | DiPlacido et al. ........... | 709/206 |
| 2008/0133669 A1 | 6/2008 | Ge et al. | |
| 2008/0183822 A1 | 7/2008 | Cai et al. | |
| 2008/0222254 A1 | 9/2008 | Mukherjee | |
| 2010/0011079 A1 | 1/2010 | Hitchcock et al. | |
| 2010/0017371 A1* | 1/2010 | Whalin et al. .................... | 707/3 |
| 2011/0191428 A1* | 8/2011 | Nairn et al. ................... | 709/206 |

FOREIGN PATENT DOCUMENTS

| | | |
|---|---|---|
| WO | WO 01/17276 A2 | 3/2001 |
| WO | WO 2008/091636 A1 | 7/2008 |

* cited by examiner

*Primary Examiner* — Brendan Higa
(74) *Attorney, Agent, or Firm* — Myers Bigel Sibley & Sajovec, P.A.

(57) ABSTRACT

A method for self-managing group membership is disclosed. The method has a portion operating on a client terminal. The client-side portion includes determining if an email received at an email address is an intra-organizational email from a mailbox of a group. Additionally, the method provides a graphical interface element when the received email is determined to be an intra-organizational email from a mailbox of a group. The graphical interface element is configured to selectably transmit a remove instruction to the group. Moreover, the method has a portion operating on a server. The server-side portion includes receiving the remove instruction; identifying a sender of the remove instruction; locating the sender in the group member list; and unsubscribing the sender from the group member list.

22 Claims, 4 Drawing Sheets

SELF-MANAGEMENT OF GROUP EMAIL RECEPTION

I. FIELD OF THE INVENTION

The present invention relates generally to information technology and more particularly to systems for managing group mailboxes.

II. BACKGROUND OF THE DISCLOSURE

Organizations such as universities, corporations, non-profit entities, and government agencies are often structured into multiple departments each of which has members or employees assigned thereto. In order to facilitate communications with members of a department or even a group within a department, most organizations configure group mailboxes for each group and/or department containing the email addresses of each its respective members. In the context of the present invention group and group mailbox are used interchangeably to signify an organizational entity having a plurality of members subscribed thereto, and configured to facilitate communication therebetween by way of email.

Depending on the structure of the organization, persons may be members to more than one group and thus more than one group mailbox. Alternatively, a person may be a member of a department but not of a particular group within the department. Additionally, as a person's role within the organization changes, such as for example reassignment to a different project, etc., the person's membership to the group mailboxes should reflect the role change.

However, often times changes in group membership is not immediately reflected in the group mailbox member list. Instead, a manager of the group mailbox will need to add or remove an email address manually when a change to the group is made. This requires prompt notification of the change to and timely action by the group mailbox manager. Consequently, in many instances former members of a group will continue to receive emails from a group mailbox to which the person no longer belongs. This can cause annoyance and clutter in a recipient's mailbox. In addition, information to which the former group member should not be privy to may be improperly sent to the former group member.

III. SUMMARY OF THE DISCLOSURE

An object of the present invention is to provide a process by which a person can self-manage their membership to a group mailbox.

An embodiment of the present invention is a method for self-managing group email reception. The method includes determining if an email received at an email address is an intra-organizational email from a mailbox of a group; and providing a graphical interface element when the received email is determined to be an intra-organizational email from a mailbox of a group. The graphical interface element is configured to selectablely transmit a remove instruction to the group.

Moreover, the present embodiment includes steps executed on a server-side. The server-side steps include receiving the remove instruction; identifying a sender of the remove instruction and a group from which the sender is requesting removal; and locating the sender in a member list of the group.

Further, the present embodiment includes a step of identifying whether membership to the group is required by the sender. If the sender is required to be a member of the group, the sender is identified as not to receive emails from the group. If membership to the group is not required, the sender is unsubscribed from the group.

Another embodiment of the present invention is implemented as a computer-readable storage device embodying instructions executable by one or more processors for allowing self-management of group email reception. The instruction embodied on the computer-readable storage device causes a client-side processor to determining if an email received at an email address is an intra-organizational email from a mailbox of a group; and providing a graphical interface element when the received email is determined to be an intra-organizational email from a mailbox of a group. The graphical interface element is configured to selectablely transmit a remove instruction to the group. Additionally, the instructions cause a server-side processor to receive the remove instruction; identifying a sender of the remove instruction and a group from which the sender is requesting removal; and locating the sender in a member list of the group.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
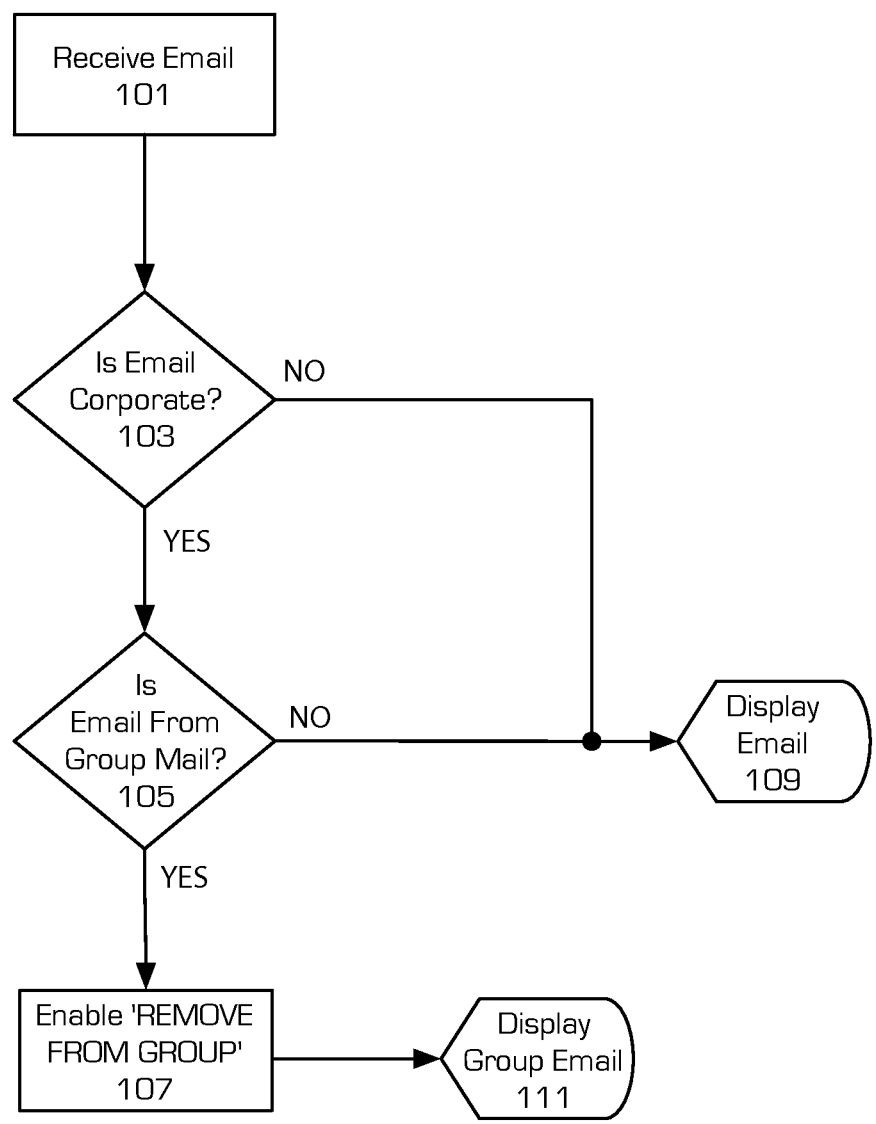
FIG. 1 illustrates a flow diagram of a client-side process in accordance with an embodiment of the present invention.

Referring to FIG. 1, a flow chart illustrates the steps performed by a client-side terminal in an embodiment of the present invention. Initially the process begins once an email is received in step 101 by an email program, such as Microsoft Outlook®, Novell Groupwise®, and Lotus Notes®. The client-side process determines if the received email is a corporate, i.e. intra-organizational, email in step 103. Corporate emails can be identified by a domain of the senders email address for example. Alternatively, parsing an email as an xml (extensible markup language) allows access to underlying header information such as the mailto field, which can also be used for determining if the email originated from a corporate account. If the email is not a corporate email, meaning that the email does not originate within the same organization as the recipient, the email is processed in the conventional manner and displayed in step 109 in an email message window.

However, if the determination in step 103 is that the email is a corporate email, the process proceeds to step 105. In step 105, a determination is made whether the email is a group mail. A more detailed discussion of the process involved for determining whether an email originated from a group mailbox will be discussed with reference to FIG. 2. If the result is negative, meaning that the email is not a group mail, the email is processed in the conventional manner and displayed in step 109 in the email message window.

Figure 3:
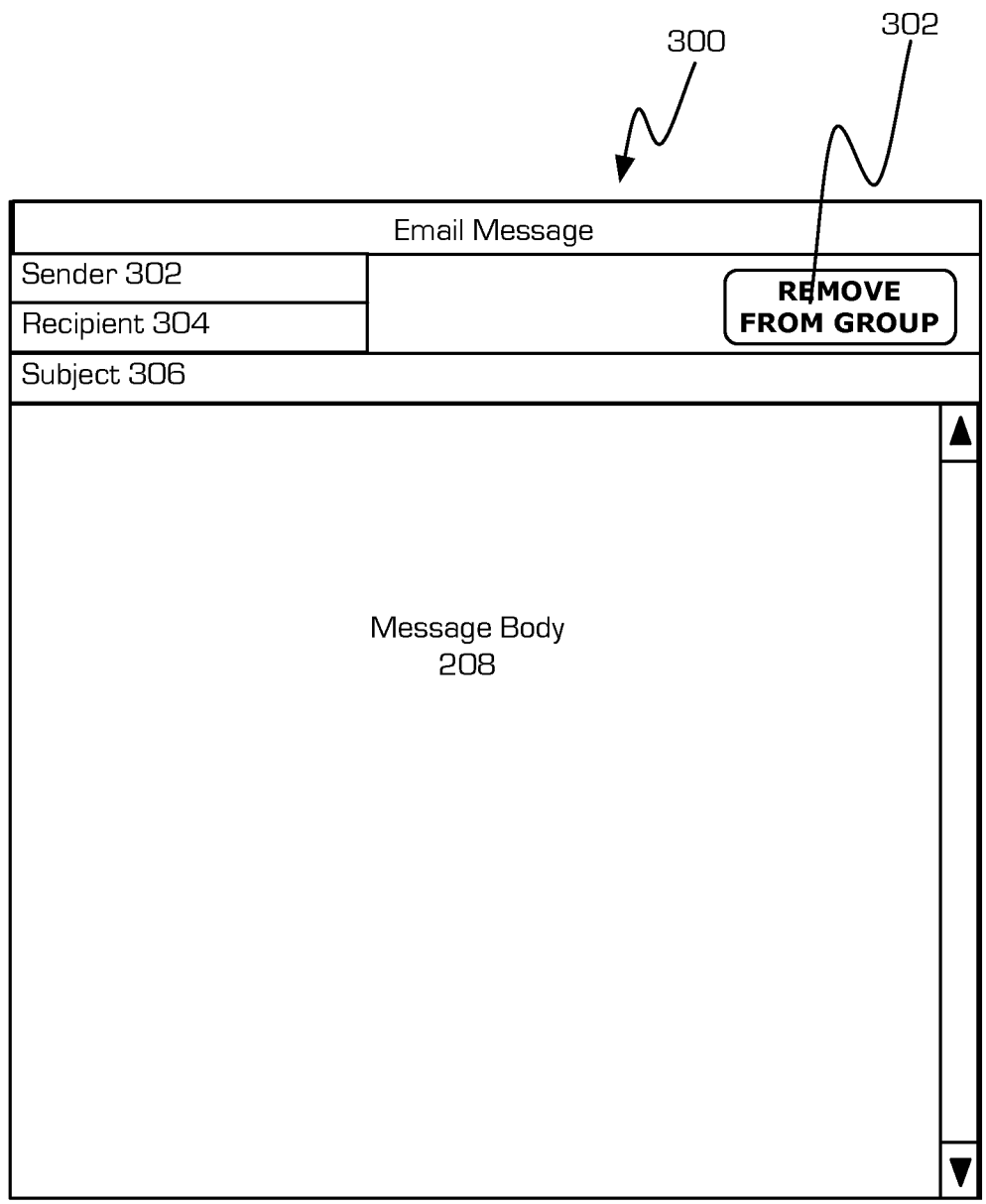
FIG. 3 illustrates a representation a generic email message window of a group email in accordance with an embodiment of the present invention.

On the other hand, if the determination is positive, meaning that the email is a group mail, the process proceeds to step 107. In step 107, a REMOVE FROM GROUP button is enabled in the email program. The email is displayed in step 111. In this case, the email window displays the REMOVE FROM GROUP button 310 as shown in FIG. 3.

Thus, when an email message is not from an intra-organizational group mailbox, the email message is displayed in a conventional email message window as provided by the particular email client program being used. However, when the email message is from an intra-organizational group mailbox, the email message is displayed in a modified version of the conventional email message window that includes the REMOVE FROM GROUP button 310.

While the present invention is illustrated in the figures and described herein as providing a REMOVE FROM GROUP button 310, it is contemplated that other appropriate graphical interface elements may be used without deviating from the present invention. For example the REMOVE FROM GROUP button 310 may instead be implemented as a checkbox.

In the present invention, the implementation of the process shown in FIG. 1 is provided by way of an extension or plugin to a conventional client email program. However, in the alternative, the implementation may be integrated into a client email program as well.

Figure 2:
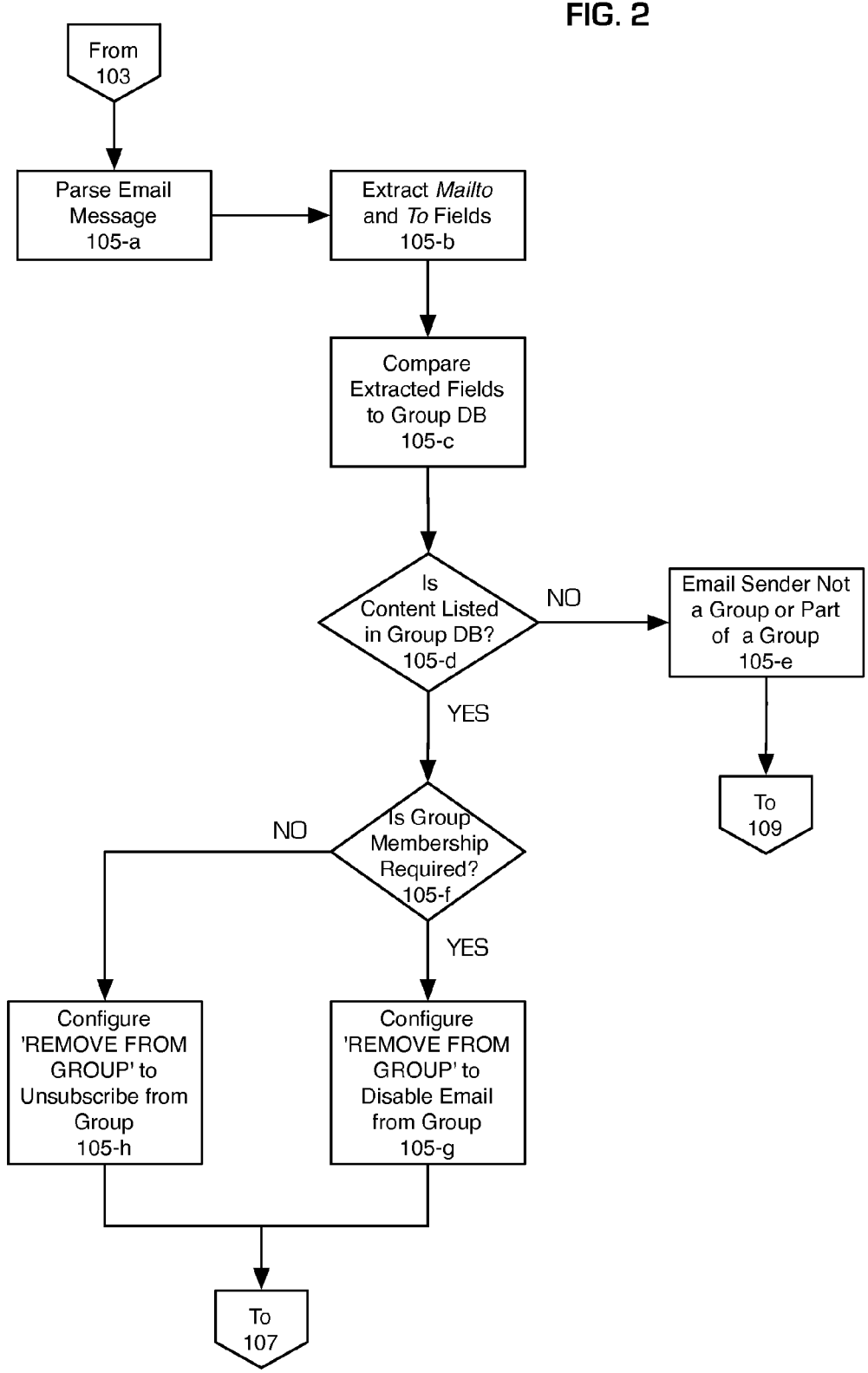
FIG. 2 illustrates a sub-process of the embodiment shown in FIG. 1.

Once the process of FIG. 1 determines that the received email message is a corporate email, the process continues to step 105 which includes the processes shown in FIG. 2. The process illustrated in FIG. 2 is provides the sub-steps performed in step 105 of FIG. 1. Thus, the sub-process of FIG. 2 initiates following the YES result of step 103, and terminates to either step 107 or step 109 depending on the results of the processing conducted herein.

Turning to FIG. 2, the sub-process of step 105 begins at step 105-a where the email message is parsed as extensible markup language (XML) or raw text for example. The parsed email message is searched for MAILTO and TO fields in step 105-b and the contents of those fields are extracted. The sub-process compares the contents of the extracted fields with a Groups database in step 105-c. The Group database lists all the groups in the organization, or in the alternative all the groups to which the recipient is subscribed. The Group database may be locally stored on the recipient's terminal or may be accessible from a server over a corporate network.

If in step 105-d it is determined that the content of either the MAILTO or TO field is not listed in the Group database, then the sub-process proceeds to step 105-e where the email message is declared not to be sent from a group or from a member to a group. The sub-process at this point returns to the main process of FIG. 1 and proceeds to step 109 therein.

However, if in step 105-d it is determined that the content of either the MAILTO or TO field is listed in the Group database, then the sub-process proceeds to step 105-f. In step 105-f the sub-process determines if membership to the group is required based on the group entry in the Group database. If membership to the group is required, such as in the case where the group membership is required for providing the subscriber with access privileges, then at step 105-g the remove instruction is configured to include a command instructing the group mail server to disable email delivery from the group to the recipient.

Alternatively, if membership to the group is not required, then the sub-process configures the remove instruction to include a command instructing the group mail server to unsubscribe, i.e. remove, the recipient from the group in step 105-h. Once the sub-process has completed either step 105-g or step 105-h, the sub-process proceeds to step 107 of the main process shown in FIG. 1

Figure 4:
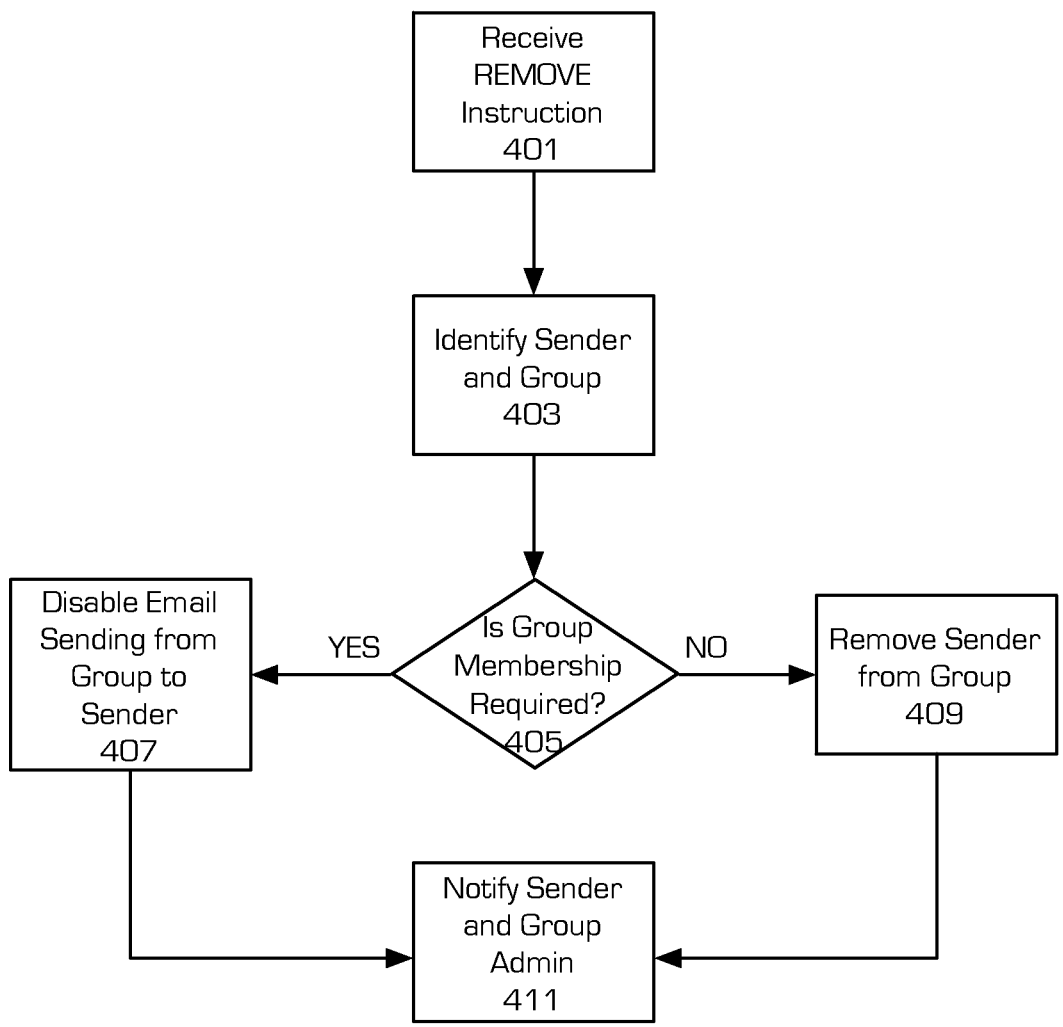
FIG. 4 illustrates a flow diagram of a server-side process in accordance with an embodiment of the present invention.

In the embodiment shown in FIG. 2, the determination regarding whether membership to a group is required or not is performed on the client-side terminal. However, in an alternative embodiment the determination can be made on the server-side group email server as shown in FIG. 4. In the alternative embodiment step 105-f and step 105-g are omitted and step 105-h configures the remove instruction with a generic removal command.

Referring to FIG. 3, the group mailbox email message is displayed in an email message window 300. Generally, an email message window 300 includes a field listing the sender 302, a field listing the recipient 304, and a subject field 306. Additionally, an area of the window is reserved for displaying the message body 308. In addition to the elements described as parts of the email message window 300, other graphical interface elements may be present that are typical of the particular email client being used. The present invention does not contemplate any limitation to the implementation of the email message window 300 or to the interface elements provided thereon.

The email message window 300 of FIG. 3 is a modification of a conventional email message window. Specifically, the email message window 300 in FIG. 3 also includes a button 310 designated as 'REMOVE FROM GROUP'. The email message window 300 is thus implemented when the received email is an intra-organizational group mail.

In the case where a recipient of a group mail is no longer a member of the group or no longer wishes to receive group mail, the recipient can click on the REMOVE FROM GROUP button 310 in a conventional manner. Clicking on the REMOVE FROM GROUP button 310 executes a process in which the group mail server for the unwanted group mail is identified, and a remove instruction is transmitted to the group mail server. The remove instruction can be transmitted in the body of an email message, as a custom SMTP (simple mail transfer protocol) command, or custom POP3 command. In all cases, the instruction provides the group mail server with an instruction to remove the recipient from the group mail recipient list. For example, the instruction may constructed with a remove keyword followed by an identifier for the recipient, such as the recipient's email address, and an identifier of the group, such as the group name.

In the case where the remove instruction is sent as a custom SMTP or POP3 command, rather than in the body of an email, the group mail server must be configured to recognize and properly parse the custom command. The configuration can be implemented by way of a server plugin, extension or module, for example.

Alternatively, the remove instruction can be sent by way of any appropriate network protocol or port configured on both the client-side terminal and server-side group email server for the purpose. In this case the server-side group email server is configured to monitor the port so configured for incoming remove instructions.

Referring to FIG. 4, a server-side process is shown reflecting the steps performed by the group mail server upon reception of a remove instruction in step 401. The server identifies the sender of the remove instruction, i.e., the recipient of the group mail message, and the group from which the recipient wishes to be removed in step 403, and locates the recipient in the recipient list of the group. In step 405, the server-side process determines if membership to the group is required. If membership to the group is required, the process proceeds to step 407 otherwise the process proceeds to step 409.

If the process continues to step 407, the server proceeds with marking the recipient in the group as not to receive emails from the group. However, the recipient remains subscribed to, or a member of, the group. If the process continues to step 409, the server proceeds with unsubscribing the recipient from the group by, for example, removal of the recipient's email address and any other information stored in the recipient list of the group that is connected to the recipient.

The process completes with step 411, in which the server notifies the recipient that the requested action has been successfully completed. Additionally, in step 411, the group administrator is also notified of the change to the group recipient list.

In an alternative embodiment, step 405 may be optional if the client-side process is configured to perform step 105-*f*. In the case where the client-side process performs step 105-*f*, step 405 of the server-side process be substituted by a step of checking which instruction is provided in the remove instruction. The substitute step 405 proceeds to either step 407 or 409 depending on the action designated by the remove instruction.

An embodiment of the present invention is configured as one or more computer-readable storage devices containing thereon one or more programs executable by a computer to perform the functions identified above. As understood in the art, and in the context of the present invention, computer-readable storage devices and computer-readable medium are understood to encompass all forms of media that are capable of storing a computer program in a form in which a computer is able to read and execute the program. Computer-readable storage devices and computer-readable medium are not intended to include transitory electromagnetic carrier signals.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A method for self-managing group email reception from a client terminal, the method comprising:
   determining if an email received at an email address is an intra-organizational email from a mailbox of a group;
   providing a graphical interface element when the received email is determined to be an intra-organizational email from a mailbox of a group, the graphical interface element being configured to selectablely transmit a remove instruction to the group;
   receiving the remove instruction by a server configured to manage groups;
   identifying by the server a sender of the remove instruction and a group from which the sender is requesting removal;
   locating by the server the sender in a member list of the group; and
   identifying by the server whether membership to the group is required by the sender, wherein if the sender is required to be a member of the group, the sender is identified as not to receive emails from the group, and if membership to the group is not required the sender is unsubscribed from the group.

2. The method as in claim 1, wherein the determining if an email received at an email address is an intra-organizational email from a mailbox of a group and the providing a graphical interface element when the received email is determined to be an intra-organizational email from a mailbox of a group, are performed by a client-side email program executable by the client terminal.

3. The method as in claim 1, wherein the determining if an email received at an email address is an intra-organizational email from a mailbox of a group and the providing a graphical interface element when the received email is determined to be an intra-organizational email from a mailbox of a group, are performed by an add-on extension to a client-side email program executable by the client terminal.

4. The method as in claim 1, wherein the graphical interface element is a button disposed on an email message window.

5. The method as in claim 1, wherein if membership to the group is required, the remove instruction includes a command to disable reception of email by client-side email program from the group, and if membership to the group is not required the remove instruction includes a command to unsubscribe from the group.

6. The method as in claim 1, further comprising unsubscribing the sender from the group based on the identification that membership to the group is not required.

7. The method as in claim 1, further comprising preventing the sender from receiving emails from the group based on the identification that membership to the group is required.

8. A computer readable storage device embodying program instructions executable by one or more processors for allowing self-management of group email reception, the instructions comprising:
   client-side program instructions comprising:
      determining if an email received at an email address is an intra-organizational email from a mailbox of a group; and
      providing a graphical interface element when the received email is determined to be an intra-organizational email from a mailbox of a group, the graphical interface element being configured to selectablely transmit a remove instruction to the group; and
   server-side program instructions comprising:
      receiving the remove instruction;
      identifying a sender of the remove instruction and a group from which the sender is requesting removal;
      locating the sender in a member list of the group; and
      identifying whether membership to the group is required, wherein if membership to the group is required, the remove instruction includes a command to disable reception of email from the group by the sender, and if membership to the group is not required the remove instruction includes a command to unsubscribe the sender from the group.

9. The computer readable storage device as in claim 8, wherein the client-side program instructions are performed by an email program executed by a client terminal.

10. The computer readable storage device as in claim 8, wherein the server-side program instructions are performed by an email server.

11. The computer readable storage device as in claim 8, wherein the client-side program instructions are performed by an add-on extension of a client-side email program executable by a client terminal.

12. The computer readable storage device as in claim 8, wherein the graphical interface element is a button disposed on an email message window.

13. The computer readable storage device as in claim 8, wherein the remove instruction is contained in an email sent to the server-side.

14. The computer readable storage device as in claim 8, further comprising the server-side program instructions of unsubscribing the sender from the group if the remove instruction includes the command to unsubscribe the sender from the group.

15. The computer readable storage device as in claim 8, further comprising the server-side program instructions of disabling reception of email from the group by the sender based on the identification that membership to the group is required.

16. A computer readable storage device embodying program instructions executable by one or more processors for allowing self-management of group email reception, the instructions comprising:
   client-side program instructions comprising:
   determining if an email received at an email address is an intra-organizational email from a mailbox of a group; and
   providing a graphical interface element when the received email is determined to be an intra-organizational email from a mailbox of a group, the graphical interface element being configured to selectablely transmit a remove instruction to the group; and
   server-side program instructions comprising:
   receiving the remove instruction;
   identifying a sender of the remove instruction and a group from which the sender is requesting removal;
   locating the sender in a member list of the group; and
   identifying whether membership to the group is required by the sender, wherein if the sender is required to be a member of the group, the sender is identified as not to receive emails from the group, and if membership to the group is not required the sender is unsubscribed from the group.

17. A method for self-managing group email reception from a client terminal, the method comprising:
   receiving a remove instruction at a server configured to manage groups;
   identifying by the server a sender of the remove instruction and a group from which the sender is requesting removal;
   locating by the server the sender in a member list of the group; and
   identifying by the server whether membership to the group is required by the sender, wherein if the sender is required to be a member of the group, the sender is identified as not to receive emails from the group, and if membership to the group is not required the sender is unsubscribed from the group.

18. The method as in claim 17, further comprising unsubscribing the sender from the group based on the identification that membership to the group is not required.

19. The method as in claim 17, further comprising preventing the sender from receiving emails from the group based on the identification that membership to the group is required.

20. A method for self-managing group email reception from a client terminal, a method comprising:
   receiving a remove instruction at a server configured to manage groups;
   identifying by the server a sender of the remove instruction and a group from which the sender is requesting removal;
   locating by the server the sender in a member list of the group; and
   identifying by the server whether membership to the group is required, wherein if membership to the group is required, the remove instruction includes a command to disable reception of email from the group by the sender, and if membership to the group is not required the remove instruction includes a command to unsubscribe the sender from the group.

21. The method as in claim 20, further comprising unsubscribing the sender from the group based on the identification that membership to the group is not required.

22. The method as in claim 20, further comprising preventing the sender from receiving emails from the group based on the identification that membership to the group is required.

* * * * *